United States Patent
Robison et al.

(10) Patent No.: US 8,893,964 B2
(45) Date of Patent: Nov. 25, 2014

(54) SECURE POINT OF SALE PRESENTATION OF A BARCODE AT AN INFORMATION HANDLING SYSTEM DISPLAY

(71) Applicant: Dell Products L.P., Round Rock, TX (US)

(72) Inventors: Charles D. Robison, Round Rock, TX (US); Richard W. Schuckle, Austin, TX (US); Rocco Ancona, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/840,393

(22) Filed: Mar. 15, 2013

(65) Prior Publication Data

US 2014/0263623 A1    Sep. 18, 2014

(51) Int. Cl.
*G06K 5/00*      (2006.01)
*G06K 15/00*    (2006.01)
*G06Q 20/40*    (2012.01)

(52) U.S. Cl.
CPC ................................. *G06Q 20/401* (2013.01)
USPC .......................................... 235/380; 235/383

(58) Field of Classification Search
CPC ... G06Q 20/08; G06Q 20/20; G06Q 20/3274; G06Q 20/3276; G06Q 20/3278; G06Q 20/3224; G06Q 20/3674; G06Q 20/3623; G06Q 20/327
USPC .............................. 235/380, 383, 462.01, 375
See application file for complete search history.

(56) References Cited

U.S. PATENT DOCUMENTS

| | | | |
|---|---|---|---|
| 8,335,489 | B2 | 12/2012 | Hamada |
| 8,368,594 | B2 | 2/2013 | Khan et al. |
| 2009/0254479 | A1* | 10/2009 | Pharris ............................ 705/42 |
| 2009/0281904 | A1* | 11/2009 | Pharris ............................ 705/17 |
| 2010/0279610 | A1* | 11/2010 | Bjorhn et al. ................. 455/41.2 |
| 2011/0208659 | A1* | 8/2011 | Easterly et al. ................. 705/79 |
| 2012/0185317 | A1* | 7/2012 | Wong ......................... 705/14.23 |
| 2012/0185579 | A1 | 7/2012 | Watanabe |
| 2012/0253852 | A1 | 10/2012 | Pourfallah et al. |
| 2012/0253973 | A1 | 10/2012 | Harter |
| 2012/0267432 | A1 | 10/2012 | Kuttuva |
| 2012/0290731 | A1 | 11/2012 | Suumaki et al. |
| 2012/0315848 | A1 | 12/2012 | Smith et al. |
| 2013/0026232 | A1 | 1/2013 | Zhou et al. |
| 2013/0173915 | A1* | 7/2013 | Haulund ....................... 713/159 |
| 2013/0198019 | A1* | 8/2013 | Smith ............................ 705/17 |

* cited by examiner

*Primary Examiner* — Tuyen K Vo
(74) *Attorney, Agent, or Firm* — Terrile, Cannatti, Chambers & Holland, LLP; Robert W. Holland

(57) ABSTRACT

Unauthorized copying of a transaction barcode is prevented by including a sensed condition or other publicly-accessible data with the transaction barcode for use as a comparison with the publicly accessible data determined at a barcode reader. If the sensed condition included in the transaction barcode indicates that the transaction barcode was generated for a different transaction, then the barcode reader invalidates the transaction. For instance, if the barcode was generated too distant in time, position, or sequential transactions, then the barcode reader invalidates the transaction barcode as an unauthorized copy of a transaction barcode generated for a different transaction.

6 Claims, 2 Drawing Sheets

SECURE POINT OF SALE PRESENTATION OF A BARCODE AT AN INFORMATION HANDLING SYSTEM DISPLAY

BACKGROUND OF THE INVENTION

1. Field of the Invention

The present invention relates in general to the field of information handling system barcode presentation, and more particularly to a secure point of sale presentation of a barcode at an information handling system display.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Mobile telephones are essentially portable information handling systems that have a small housing suitable for use as a telephone handset. Improved processing and communications at mobile telephones have allowed end users to increasingly rely on mobile telephones for a wide variety of tasks. A mobile telephone Internet interface running a secure application or web browser allows end users to access work and financial information from virtually anywhere in a secure manner. Some applications not only allow access to account balance information but also allow a mobile telephone user to make purchases at a point of sale with the mobile telephone. One example of this type of service is LEVEL UP, which generates a quick response (QR) code at a display of a mobile telephone that an end user can present to a point of sale vendor to purchase goods and/or services. The QR code includes an account identifier that the point of sale vendor accesses for payment.

In order to complete a secure transaction at a point of sale, the vendor who receives funds from the mobile telephone user's account has an interface with the mobile telephone user's account manager, such as a bank or credit card company, to verify and transfer funds. The mobile telephone user presents the account identifier to the vendor by generating a QR code on the mobile telephone display that embeds the account identifier, and holding the display proximate to a QR code reader. An end user thus has the ability to obtain goods and services with a "virtual token" rather than presenting a physical token, such as a credit card. To provide security, LEVEL UP uses a proprietary QR code generator so that qualified vendors can read the account identifier. One difficulty with this approach is that an unauthorized user can simply capture an image of a QR code and use the image for unauthorized transactions. For instance, many smartphones have the ability to capture a display as an image and save the image with other photographs. As another example, an unauthorized user can capture the image with an unauthorized use of a QR code reader or by snapping a picture of the display of the mobile telephone. The mobile telephone user has no practical way of identifying the illicit use until a fraud has occurred.

SUMMARY OF THE INVENTION

Therefore a need has arisen for a system and method which secures a QR code presented at a mobile telephone from being copied and used in an unauthorized manner.

In accordance with the present invention, a system and method are provided which substantially reduce the disadvantages and problems associated with previous methods and systems for presenting a QR code at a mobile telephone display in a secure manner. A barcode generated for payment at a point of sale includes information for sensed conditions at the time of the payment that may be independently generated by a barcode scanner that reads the barcode. If the sensed conditions do not match independently generated conditions by the barcode scanner, the payment is invalidated.

More specifically, a mobile telephone information handling system executes a transaction engine that gathers information to authorize payment from an account having an identifier, including publicly accessible information, such sensed time or position information at the point of sale. The transaction engine provides the information to a barcode generator, which embeds the information in a barcode presented at a display of the mobile telephone information handling system. The end user presents the displayed barcode a barcode scanner of a point of sale vendor. The barcode scanner reads the barcode and extracts the embedded information for payment of goods and or services. Before authorizing the payment, the barcode scanner independently determines the sensed conditions or other publicly available information and compares the independently determined information with that embedded in the barcode. If the sensed conditions and/or other publicly available information does not match, the payment is not authorized. In one embodiment, the sensed information and/or publicly available information is used as a key to encrypt the barcode.

The present invention provides a number of important technical advantages. One example of an important technical advantage is that a QR code is presented at a mobile telephone in a secure manner that reduces the risk of unauthorized re-use. Public information shared by both the mobile phone and the vendor is used as a key to encrypt the QR code so that the QR code works for point of sale transactions in a limited time frame and/or location. If an unauthorized image of the QR code is captured, fraudulent use of the image is restricted to a limited time and location, which is generally not practical for most unauthorized users. An unauthorized image that is presented outside of the limited time frame and/or location for which it is created will not decrypt to allow a vendor to obtain embedded account information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Shared reference to publicly accessible information by a portable information handling system that generates a barcode and a barcode reader that reads the barcode prevents unauthorized repeated use of a copy of the barcode. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
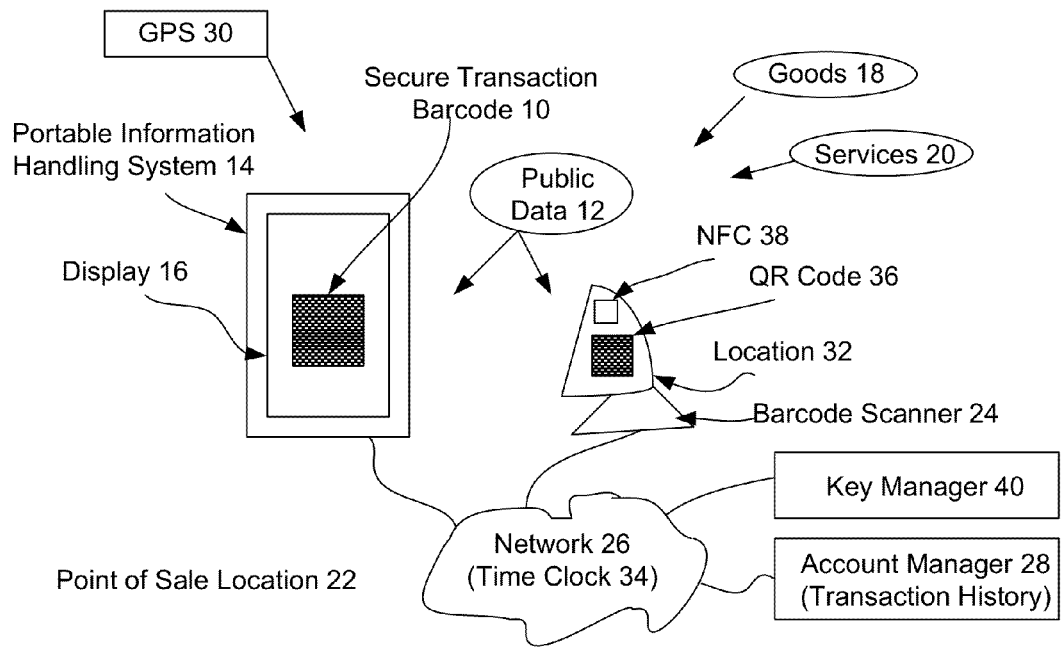
FIG. 1 depicts a block diagram of a secure transaction barcode generated based on a shared reference to publicly accessible information, such as sensed conditions at the transaction.

Referring now to FIG. 1, a block diagram depicts a secure transaction barcode 10 generated based on a shared reference to publicly accessible data 12, such as sensed conditions at the transaction. A portable information handling system 14, such as a mobile telephone, includes a display 16 that presents information as visual images. An end user of portable information handling system 14 initiates an application executing on portable information handling system 14 to present a secure transaction barcode 10 at display 16 to pay for goods 18 or services 20 purchased by the end user at a point of sale transaction location 22. For instance, an end user purchases an electronics device or repairs performed on an electronics device from a retail location by presenting secure transaction barcode 10 at a mobile telephone 14. The secure transaction barcode includes an account identifier from which the end user has authority to authorize transfer of funds to the retailer as payment for the goods 18 or service 20. The retailer has a barcode scanner 24 at the point of sale transaction location 22 to scan secure transaction barcode 10. Barcode scanner 24 retrieves the account identifier from secure transaction barcode 10 and obtains funds by communication of the account identifier through a network 26 to an account manager 28.

In order to restrict re-use of a secure transaction barcode 10, portable information handling system 14 includes shared public data 12 with secure transaction barcode 10. Barcode reader 24 obtains the shared public data 12 independently from portable information handling system 14 and compares the independently-obtained shared public data with that included in secure transaction barcode 10 to validate or invalidate the transaction. In one embodiment, the shared public data 12 is used as a key to encrypt the account identifier so that secure transaction barcode 10 is effectively unusable unless presented at a time or location where it is originally intended to be used. Other keys may also be used, and the shared public information may be used to encrypt only part of the information included in the barcode. Alternatively, the shared public information is included in an encrypted or unencrypted portion of secure transaction barcode 10. One of several possible types of public data 12 may be used or combinations of public data 12 may be required to validate a transaction. One type of public data is a geospatial location, such as a GPS position 30 retrieved by portable information handling system 14 with a GPS receiver and compared to geospatial location 32 stored in memory of barcode scanner 24. To prevent inadvertent invalidation, the geospatial locations may be rounded and/or truncated so that measuring inaccuracies do not create a mismatch. Matching the GPS position 30 and the location 32 ensure that secure transaction barcode 10 will only be used at the location where it was generated. Another type of public data 12 is a time stamp 34, such as a time retrieved from a network 26, such as a mobile telephone network. To prevent inadvertent invalidation, the time retrieved by portable information handling system 14 and barcode scanner 24 may be truncated and/or rounded to a time period around the actual sensed time. Matching the times from portable information handling system 14 and barcode scanner 24 ensures that secure transaction barcode 10 will only be used at the time when it was generated.

Other types of public data 12 that are less easily accessed from public sources may be used to avoid repeated use of a secure transaction barcode 10, such as by an unauthorized picture or other copy of secure transaction barcode 10. One example is including in secure transaction barcode 10 at least some information from previous transactions associated with the account identifier. Portable information handling system 14 stores in local memory information related to transactions and the sequential order of the transactions, such as the amount, the time, the location, the proprietor, the goods or services purchased, the price, an increment of changes to the account over a predetermined time period, etc. . . . Barcode scanner 24 retrieves the previous transaction information from secure transaction barcode 10 and compares the retrieved information with account information retrieved from account manager 28 to determine if any intervening transactions occurred in the account since the generation of the secure transaction barcode 10. If intervening transactions did occur, then barcode scanner 24 invalidates the use of the secure transaction barcode 10.

Another type of less-accessible public information is information presented at barcode scanner 24 that is retrieved to portable information handling system 14 and then used in secure transaction barcode 10. For instance, a QR code 36 or an NFC device 38 include information that portable information handling system 14 reads with a QR code reader or an NFC reader and applies for creation of secure transaction barcode 10. The use of information read at point of sale location 22 in a secure transaction barcode 10 helps to make sure that the secure transaction barcode 10 is generated at point of sale location 22 and not copied from a previous transaction at a different location. In one embodiment, QR code 36 and/or NFC 38 includes a network address that portable information handling system 14 accesses to obtain a key from a key manager 40 that is used to encrypt at least some information of secure transaction barcode 10. Barcode scanner 24 obtains the same key, such as by issuing a different key with each sequential transaction, and applies the key to decrypt secure transaction barcode 10. In various embodiments, combinations of various types of publicly-accessible data may be used. For example, the QR code 36 or NFC 38 may include a list of the types of information that a secure transaction barcode 10 must include at the point of sale location 22 so that one location might require time, another GPS location, another last transaction, another the phone number of the portable information handling system 14, another the email address of the end user, etc. . . . . In each instance, the inclusion of a particular type of information restricts the re-use of the secure transaction barcode 10 in the event that an unauthorized copy is made.

Figure 2:
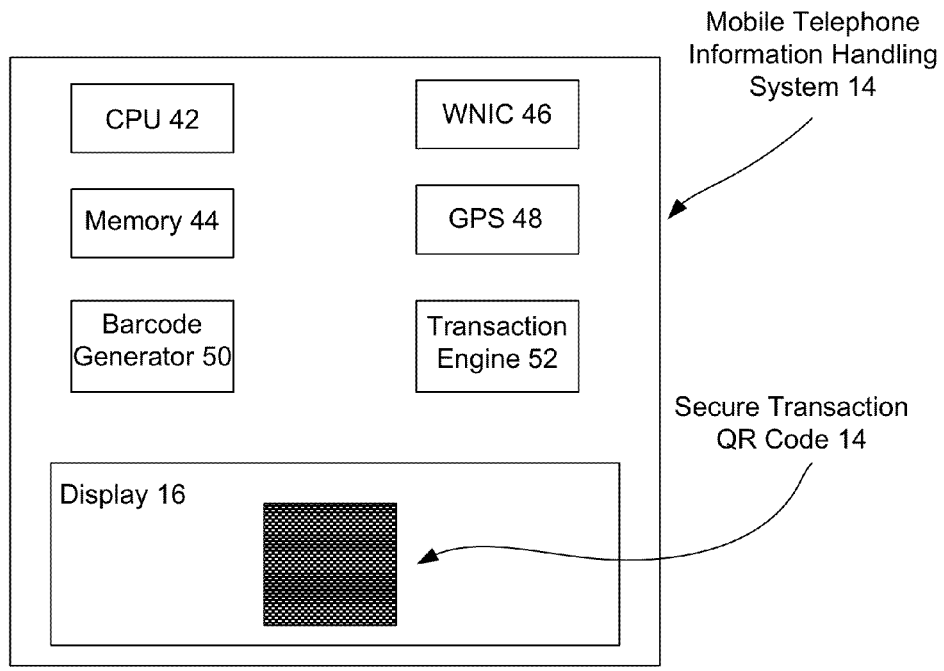
FIG. 2 depicts a block diagram of a system for secure transaction barcode generation based on a shared reference to publicly accessible information, such as sensed conditions at the transaction.

Referring now to FIG. 2, a block diagram depicts a system for secure transaction barcode generation based on a shared reference to publicly accessible information, such as sensed conditions at the transaction. A mobile telephone information handling system 14 has a telephone handset form factor with a processor 42 that executes instructions and a memory 44 interfaced with processor 42 to store the instructions and other information. Mobile telephone information handling system 14 interfaces with external networks through a wireless network interface card 46, such as a wireless wide area network (WWAN) or a wireless local area network (WLAN), and interfaces with a GPS system with a GPS receiver 48 to determine a geospatial position. Processor 42 processes information in cooperation with memory 44 to generate visual images at display 16, such as secure transaction barcode 10. For instance, a barcode generator 52 executes on processor 42 to create QR codes with information stored in memory 44 and presents the QR code as a secure transaction code 10 at display 16. A transaction engine 52 executes on processor 42 to assemble information for inclusion in a QR code generated by barcode generator 50. Transaction engine 52 assembles account information, such as an account identifier and historical transactions retrieved through WNIC 46, along with publicly accessible information that helps to prevent unauthorized use of copies of a QR code presented at display 16. For instance, secure transaction QR code 10 is encrypted by transaction engine 52 to include geospatial location of GPS receiver 48 within a confined radius, time in hours, minutes and seconds, increment of charges to the account identifier within a predefined timeframe, such as 15 minutes, the end user's account identifier, and a message referenced by the point of sale location for lookup of a decryption key and/or method. The time and position information encrypted within secure transaction QR code 10 limits the use of the QR code for a window of time after which the code will be rejected as invalid by a point of sale location.

Figure 3:
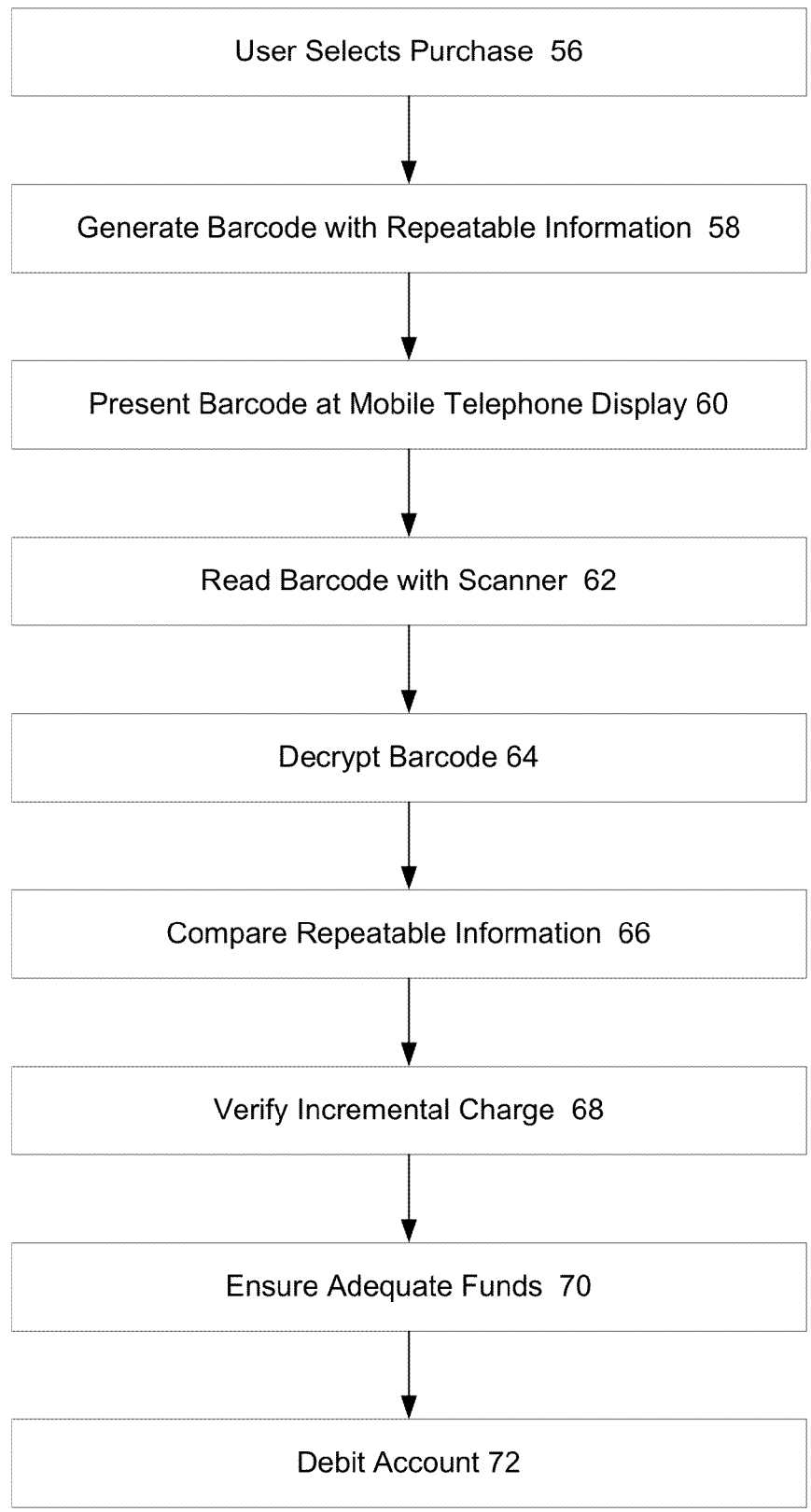
FIG. 3 depicts a flow diagram of a process of secure transaction barcode use based on a shared reference to publicly accessible information, such as sensed conditions at the transaction.

Referring now to FIG. 3, a flow diagram depicts a process of secure transaction barcode use based on a shared reference to publicly accessible information, such as sensed conditions at the transaction. The process starts at step 56 with selection of a good or service by an end user at a point of sale location. At step 58, the end user launches a transaction engine application at a mobile telephone information handling system that provides access to funds of an account having an account identifier. At step 60, the transaction engine application generates a QR code for presentation at a display of the mobile telephone information handling system. The QR code includes the account identifier and a sensed condition or other publicly accessible reference that a barcode reader can deduce without having the reference directly communicated from the mobile telephone information handling system, such as a GPS position within a predetermined tolerance, a time, a charge increment, an available balance, and encryption lookup table reference, etc. . . . .

At step 62, the point of sale vendor uses a barcode reader to read the QR code presented by the mobile telephone information handling system display. At step 64, the barcode scanner looks up the encryption table and uses an embedded key to decrypt the QR code. In one embodiment, an encryption key can include the sensed condition deduced separately by the barcode scanner from the mobile telephone information handling system, such as a time or a GPS position. At step 66, the barcode scanner reads the publicly accessible information from the barcode and compares it to locally determined information, such as a known position of the barcode scanner or a time reference. At step 68, the barcode scanner verifies an incremental charge with a cached history to ensure that a double charge is not taking place, such as might happen if an unauthorized user tried to immediately copy a purchase with a QR code used to perform an authorized purchase. At step 70, the vendor ensures that adequate funds are available for the purchase and at step 72 debits the account for the purchase.

Although the present invention has been described in detail, it should be understood that various changes, substitutions and alterations can be made hereto without departing from the spirit and scope of the invention as defined by the appended claims.

What is claimed is:

1. A method for performing a point-of-sale transaction, the method comprising:
   determining a publicly accessible data at a point-of-sale location;
   applying the publicly accessible data to encrypt an account identifier in a barcode;
   presenting the bar code at a display;
   reading barcode from the display with a barcode reader at the point-of-sale location;
   decrypting the barcode with the publicly accessible data at the point-of-sale location; and
   applying the account number from the barcode to perform the point-of-sale transaction;
   wherein determining a publicly accessible data at a point of sale location further comprises:
   determining a location with a GPS; and
   selecting a predetermined portion of the location as an encryption key to encrypt the account identifier.

2. A method for performing a point-of-sale transaction, the method comprising:
   determining a publicly accessible data at a point-of-sale location;
   applying the publicly accessible data to encrypt an account identifier in a barcode;
   presenting the bar code at a display;
   reading barcode from the display with a barcode reader at the point-of-sale location;
   decrypting the barcode with the publicly accessible data at the point-of-sale location; and
   applying the account number from the barcode to perform the point-of-sale transaction;
   wherein determining a publicly accessible data at a point of sale location further comprises:
   determining a time from a publicly accessible time source; and
   selecting a predetermined portion of the time as an encryption key to encrypt the account identifier.

3. A point of sale transaction system comprising:
   a portable information handling system having a processor operable to execute instructions to process information, memory interfaced with the processor and operable to store the information and a display interfaced with the processor and operable to present the information as visual images;

a barcode generator stored in the memory and operable to execute on the processor to apply the information to generate a barcode for presentation at the display;

a transaction engine stored in the memory and operable to execute on the processor to embed an account identifier and predetermined publicly accessible information in a barcode generated by the barcode generator, the barcode presented at the display, the transaction engine encrypting at least the account identifier by using at least a portion of the publicly accessible information as an encryption key; and a barcode reader separate from the mobile information handling system and operable to read the barcode from the display, extract the account identifier and apply predetermined publicly accessible information to validate a point-of-sale transaction, the barcode reader decrypting the account identifier with the publicly accessible information used as a decryption key;

wherein the predetermined publicly accessible information comprises a time associated with generation of the barcode, the barcode generator operable to apply the time to encrypt the account identifier in the barcode, the barcode reader applying a time at which the barcode is read to decrypt the account identifier.

4. A point of sale transaction system comprising:

a portable information handling system having a processor operable to execute instructions to process information, memory interfaced with the processor and operable to store the information and a display interfaced with the processor and operable to present the information as visual images;

a barcode generator stored in the memory and operable to execute on the processor to apply the information to generate a barcode for presentation at the display;

a transaction engine stored in the memory and operable to execute on the processor to embed an account identifier and predetermined publicly accessible information in a barcode generated by the barcode generator, the barcode presented at the display, the transaction engine encrypting at least the account identifier by using at least a portion of the publicly accessible information as an encryption key; and a barcode reader separate from the mobile information handling system and operable to read the barcode from the display, extract the account identifier and apply predetermined publicly accessible information to validate a point-of-sale transaction, the barcode reader decrypting the account identifier with the publicly accessible information used as a decryption key;

wherein the predetermined publicly accessible information comprises a GPS position associated with generation of the barcode, the barcode generator operable to apply the GPS position to encrypt the account identifier in the barcode, the barcode reader applying a GPS position at which the barcode is read to decrypt the account identifier.

5. A method for restricting use of a transaction barcode, the method comprising:

sensing a condition at a mobile telephone, the sensed condition comprising a GPS position;

generating a transaction barcode at the mobile telephone, the transaction barcode including an account identifier and the sensed condition, the sensed condition used as an encryption key to encrypt the transaction barcode;

presenting the transaction barcode at a display of the mobile telephone;

reading the transaction barcode from the display of the mobile telephone with a barcode reader;

sensing the condition at the barcode reader; and invalidating the transaction if the sensed condition included in the bar code fails to match the sensed condition at the barcode reader.

6. A method for restricting use of a transaction barcode, the method comprising:

sensing a condition at a mobile telephone, the sensed condition comprising a time;

generating a transaction barcode at the mobile telephone, the transaction barcode including an account identifier and the sensed condition, the sensed condition used as an encryption key to encrypt the transaction barcode;

presenting the transaction barcode at a display of the mobile telephone;

reading the transaction barcode from the display of the mobile telephone with a barcode reader;

sensing the condition at the barcode reader; and invalidating the transaction if the sensed condition included in the bar code fails to match the sensed condition at the barcode reader.

* * * * *